United States Patent
Toiyama et al.

(10) Patent No.: US 6,840,357 B2
(45) Date of Patent: Jan. 11, 2005

(54) HYDRAULIC DAMPING DEVICE

(75) Inventors: Yoshiro Toiyama, Tokyo (JP); René Lemieux, Granby (CA)

(73) Assignees: Bombardier Inc., Quebec (CA); Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/284,116

(22) Filed: Oct. 31, 2002

(65) Prior Publication Data

US 2004/0011612 A1 Jan. 22, 2004

(30) Foreign Application Priority Data

Jul. 18, 2002 (JP) ........................................ 2002-209430

(51) Int. Cl.[7] ................................................ F16F 9/34
(52) U.S. Cl. .............................. 188/319.2; 188/322.13
(58) Field of Search .............................. 188/266.6, 297, 188/298, 315, 319.2, 322.13, 276, 277, 278, 285, 322.19, 288, 289

(56) References Cited

U.S. PATENT DOCUMENTS

| | | | | |
|---|---|---|---|---|
| 2,710,077 A | * | 6/1955 | Fabel et al. ................. | 188/288 |
| 2,780,321 A | * | 2/1957 | Sturari ..................... | 188/282.9 |
| 3,351,160 A | * | 11/1967 | Koning et al. ............ | 188/282.5 |
| 3,584,712 A | * | 6/1971 | Dickinson ................. | 188/282.1 |
| 4,139,182 A | * | 2/1979 | Nagase et al. .............. | 267/120 |
| 4,673,068 A | * | 6/1987 | De Bruijn ................... | 188/315 |
| 4,844,428 A | * | 7/1989 | Margolis et al. ......... | 267/64.21 |
| 5,586,627 A | * | 12/1996 | Nezu et al. .............. | 188/266.6 |
| 5,788,030 A | * | 8/1998 | Rottenberger ............... | 188/290 |
| 6,443,272 B1 | * | 9/2002 | Rottenberger et al. ... | 188/319.2 |
| 6,619,446 B2 | * | 9/2003 | Rottenberger et al. . | 188/322.16 |

* cited by examiner

*Primary Examiner*—Benjamin A Pezzio
(74) *Attorney, Agent, or Firm*—Rabin & Berdo, P.C.

(57) ABSTRACT

Two oil chambers 28. 29 are formed in a cylinder 21. The piston rod oil chamber 28 is connected with a reservoir 50 formed on an outer section of the cylinder. Two parallel passages 33, 34 are formed in a sealing case 23 provided on an upper section of the cylinder. The sealing case 23 is provided with a needle valve 35 regulating the area of the opening of the passage 33, a poppet valve 37 closing the oil chamber 34 with the biasing force of the spring 40 and an adjuster 39 regulating the biasing force of the spring 40. A part of the oil flowing out of the oil chamber 28 in an expansion stroke is discharged through the needle valve 35 and the puppet valve 37 in order to allow respective regulation of the damping force at that time.

9 Claims, 3 Drawing Sheets

HYDRAULIC DAMPING DEVICE

FIELD OF THE INVENTION

This invention relates to a hydraulic damping device for a vehicle.

BACKGROUND OF THE INVENTION

A device is known in which a damping force produced by the hydraulic damping device is regulated on the basis of an external operation. An operation rod is axially disposed through a piston rod of the hydraulic damping device. A valve is provided on the tip of the rod in order to vary the damping force. The opening of the valve is varied in response to minute regulation of the axial position of the operation rod. Thus it is possible to regulate the damping force generated by the hydraulic damping device.

However since the operation rod is disposed coaxial with respect to the piston rod, the structure of the device becomes complicated. Furthermore this operation is adversely affected since the position of the operation rod results in a position which tends to interfere with the vehicle body. In addition, the basic length of the hydraulic damping device in an axial direction is increased. The function regulating the damping force is simple due to the fact that only the opening of the valve is varied. As a result, the generated damping force at a high piston speed region in the hydraulic damping device can not be regulated separately from the generated damping force at in a low piston speed region.

SUMMARY OF THE INVENTION

It is therefore an object of this invention to allow for separate regulation of a damping force generated in a low piston speed region from that in a high piston speed region.

It is a further object of this invention to improve the operation of regulating a damping force without resulting in an increase in the basic length of the hydraulic damping device.

In order to achieve above the objects the invention provides a hydraulic damping device comprising: a cylinder disposed coaxially in an outer shell; a sealing case closing the open ends of the outer shell and the cylinder; a piston disposed to slide freely in the cylinder; a piston rod connected to the piston through the sealing case; two oil chambers partitioned by the piston in the cylinder; a reservoir provided between the cylinder and the outer shell; a damping valve provided in the piston and opening and closing the passage between the two oil chambers; a base valve interposed in the passage connecting the reservoir and the oil chamber in which the piston rod is not included; two parallel passages connecting the oil chamber in which the piston rod is included and the reservoir, the passages provided in the sealing case; a needle valve disposed in the sealing case and regulating the area of the opening of the one oil passage; and a puppet valve disposed in the sealing case and biased in a direction in which the other oil passage is closed by the spring and an adjuster regulating the biasing force of the spring of the puppet valve.

The details as well as other features and advantages of the invention are set forth in the remainder of the specification and are shown in the accompanying drawings.

DESCRIPTION OF THE PREFERRED EMBODIMENTS

In order to describe the invention in greater detail, the preferred embodiments will be outlined below with reference to the accompanying drawings.

Figure 1:
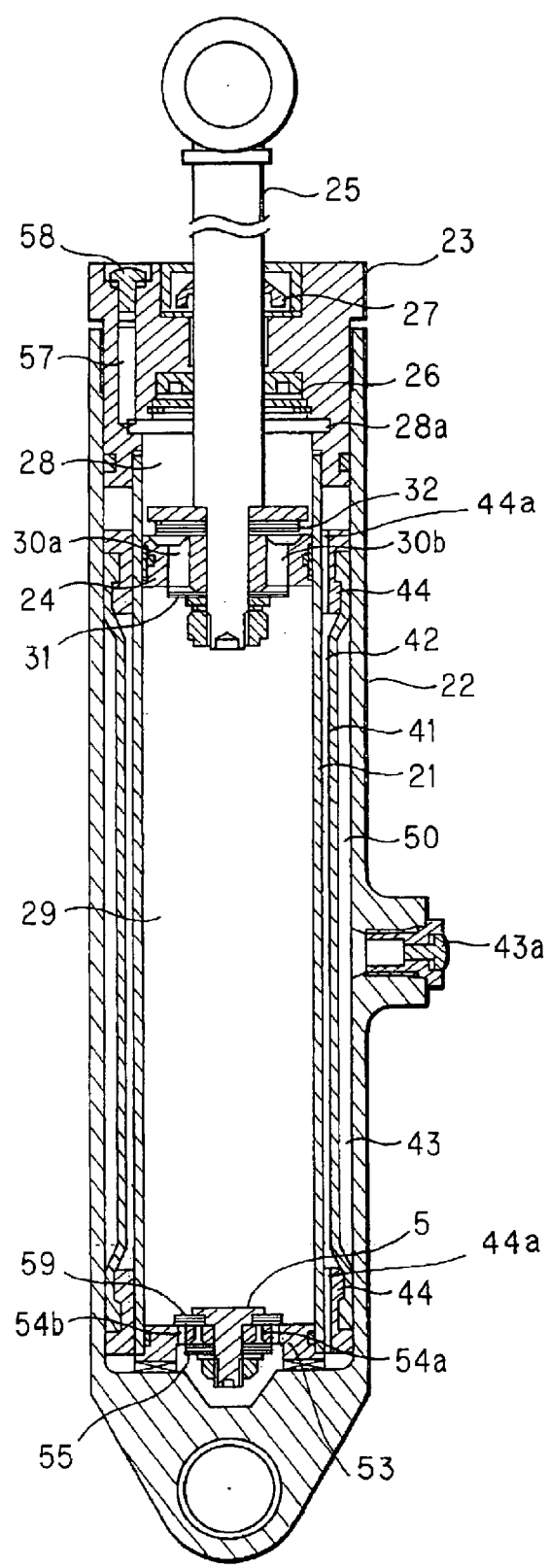
FIG. 1 is a sectional view of an embodiment of a hydraulic damping device according to this invention.

As shown in FIG. 1, a cylinder 21 is disposed coaxially to the inner side of a cylindrical outer shell 22. A sealing case 23 is mounted on the upper end of the cylinder 21 and the outer shell 22 in order to close their respective openings. The bottom comprising the lower end of the cylinder 21 and the outer shell 22 is closed.

A piston 24 is disposed to slide freely in the cylinder 21. A piston rod 25 is connected coaxially to the piston 24. The chamber in the cylinder 21 is partitioned by the piston 24 into a piston rod oil chamber 28 and a non-piston-rod oil chamber 29. The respectively chambers are filled with oil.

The ports 30a, 30b are disposed through the piston 24 in an axial direction. One port 30a is closed by a damping valve 31 provided on one face of the piston 24. The other port 30b is closed by the damping valve 32 provided on the other face of the piston 24. When the piston 24 displaces in a direction in which the piston rod 25 expands, the damping valve 31 opens and flow of oil is allowed from the oil chamber 28 into the oil chamber 29. When the piston displaces in an opposite direction in which the piston rod is compressed, the damping valve 32 opens and flow of oil is allowed from the oil chamber 29 to the oil chamber 28.

The piston rod 25 passes through the sealing case 23 which seals the open end of the cylinder 21 and the outer seal 22. Sealing is performed by providing an oil seal 26 and a dust seal 27 on the sealing case 23 in order to prevent leakage of oil from the point of entry of the piston rod 25.

A reservoir 50 is provided on an annular space between the outer shell 22 and the cylinder 21. The reservoir 50 is partitioned into an inner oil chamber 42 and an outer gas chamber 43 by a resilient cylindrical bellows 41 disposed on the inner side of the outer shell 22. The upper end and the lower end of the bellows 41 are fixed by respective rings 44. The rings 44 are press fitted to the outer periphery of the cylinder 21 and engraved passages 44a are respectively formed in the inner peripheral face of the ring 44.

The oil chamber 42 is connected to the oil chambers 28, 29 on the inner section of the cylinder by a passage such as that described below in order to allow oil flow. Gas is sealed in the gas chamber 43. Consequently when the oil amount in the oil chamber 42 fluctuates, the gas chamber 43 is compressed or expanded in order to absorb the amount of fluctuation in the oil amount. Gas is charged in the gas chamber 43 with a plug 43a provided in the outer shell 22.

Figure 2:
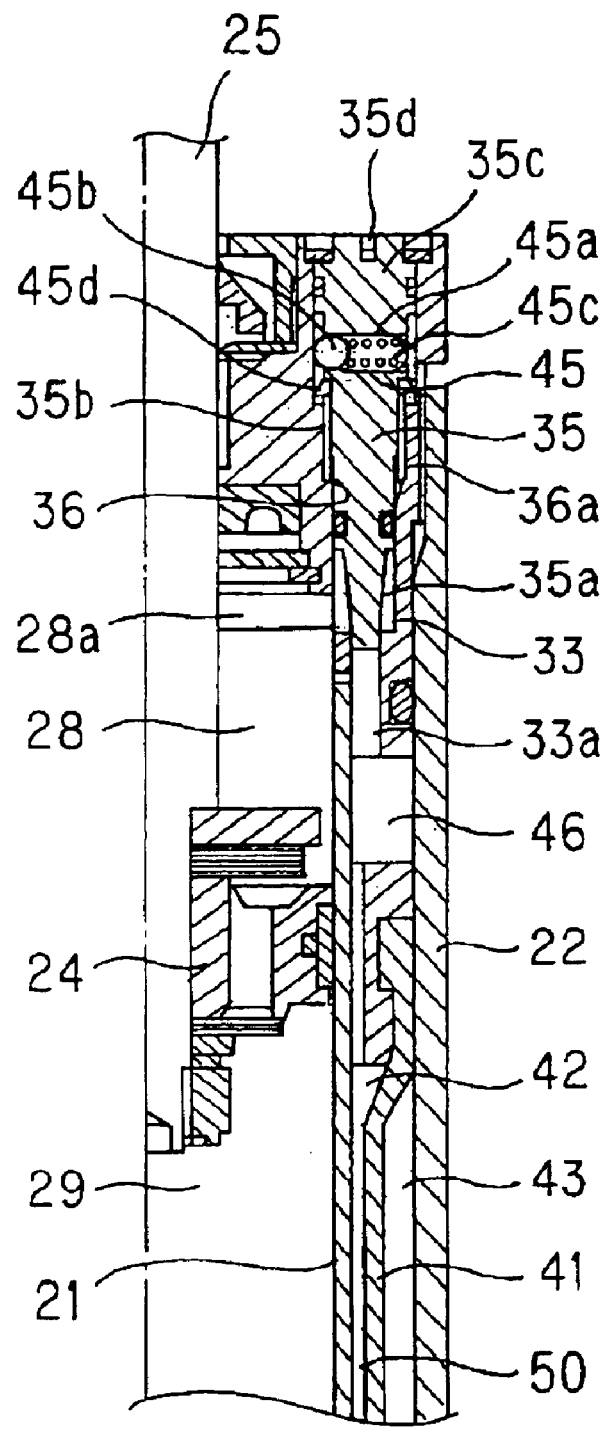
FIG. 2 is a sectional view showing a section of a needle valve.
Figure 3:
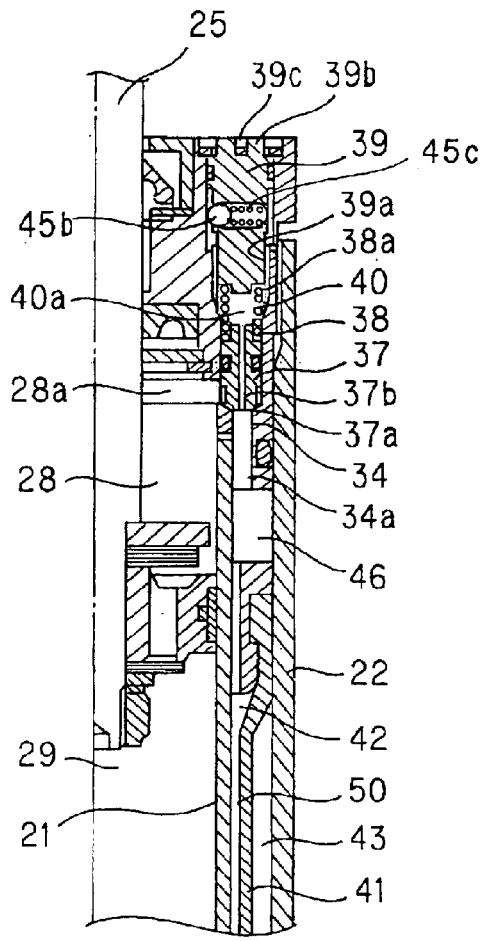
FIG. 3 is a sectional view of a section of a poppet valve.
Figure 4:
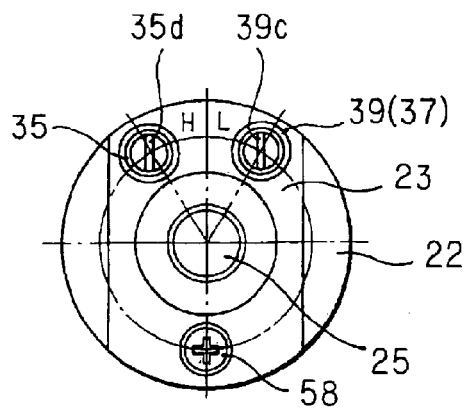
FIG. 4 is a plan view of a sealing case.

As shown in FIG. 2, FIG. 3 and FIG. 4, a first and a second oil passage 33, 34 are provided in parallel at respectively different positions in the sealing case 23. The first and the second oil passages 33, 34 connect an oil chamber 28 upwardly of the piston 24 with an oil chamber 42 in the reservoir 50. A needle valve 35 is provided in the oil passage 33 and a poppet valve 37 is provided in the oil passage 34.

The details of the needle valve 35 are shown in FIG. 2.

The needle valve 35 is inserted into a valve hole 36 provided in an axial direction with respect to the sealing case 23. A needle section 35a on the tip of the valve 35 is disposed coaxially to a port 33a which is as a section of the oil passage 33.

A threaded section 35b provided on the outer periphery of the needle valve 35 is threadably engaged with the threaded section 36a provided on the inner periphery of the valve hole 36. A head 35c of the needle valve 35 is exposed outwardly from the end of the valve hole 36. A groove 35d is formed in the head 35c of the valve 35.

Thus the needle valve 35 displaces in an axial direction when the needle valve 35 is rotated by insertion of a screwdriver in the groove 35d. The surface area of the opening of the port 33a can be varied by the tip of the needle section 35a in order to allow the flow amount of oil passing through the oil passage 33 to be varied.

A detent mechanism 45 is provided in order to determine the rotational position of the needle valve 35. The detent mechanism 45 comprises a ball 45b, a spring 45 and a plurality of grooves 45d. The ball 45b is disposed in the transverse hole 45a provided in the needle valve 35. The spring 45c pushes the ball 45b. The plurality of grooves 45d are disposed at equidistant positions in a peripheral direction on the inner periphery of the valve hole 36. The rotational position of the needle valve 35 is determined by selectively engaging the ball 45b pushed by the spring 45c into a groove 45d.

An annular groove 28a is formed on the upper section of the oil chamber 28 along the inner peripheral face of the cylinder 21. The annular groove 28a is connected with the oil passage 33. The lower end of the port 33a comprising a section of the oil passage 33 is positioned above the reservoir 50 and is connected with an annular passage 46 formed on the outer periphery of the cylinder 21. The annular passage 46 is connected with the oil chamber 42 of the reservoir 50 through an engraved passage 44a.

The details of the poppet valve 37 will be described referring to FIG. 3.

A valve hole 38 is provided in an axial direction in the sealing case 23. The poppet valve 37 is inserted slidably in the valve hole 38. An adjuster 39 is inserted into the valve hole 38 on the rear of the poppet valve 37. A threaded section 39a is provided on the outer periphery of the adjuster 39 and is threadably engaged with the threaded section 38a formed on the inner periphery of the valve hole 38. A spring 40 is interposed between the adjuster 39 and the poppet valve 37. The poppet valve 37 is pushed by the compression force of the spring 40 and the cylindrical section 37a on the tip of the poppet valve 37 seals the port 34a which is formed coaxially with respect to the poppet valve 37 and is as a section of the oil passage 34.

A relief hole 37b is formed through the axial center of the poppet valve 37. The hole 37b connects the port 34a and the spring chamber 40a housing the spring 40 on the rear of the poppet valve 37 and allows smooth displacement of the poppet valve 37.

The head 39b of the adjuster 39 is exposed outwardly from the end of the valve hole 38 and a groove 39c is formed on the exposed head 39b. Consequently the adjuster 39 can be displaced in an axial direction by rotating the adjuster 39 by insertion of a screwdriver in the groove 39c. Consequently the compressive force of the spring 40 is varied and it is possible to regulate the valve-opening force of the poppet valve 37.

The oil passage 34 is connected with the annular groove 28a of the oil chamber 28 and the lower end of the port 34a is connected with the annular passage 46.

A detent mechanism 45 is also provided on the adjuster 39 in the same manner as the component provided on the poppet valve 37. In this manner, the rotational position of the adjuster 39 can be determined.

In FIG. 1, a base valve 53 is disposed on the bottom of the cylinder 21. The base valve 53 is interposed in the oil passage connecting the oil chamber 42 of the reservoir 50 and the oil chamber 29 below the piston 24.

Mutually parallel ports 54a, 54b are formed in the base valve 53. The port 54a is closed by a damping valve 55 and the port 54b is closed by a check valve 59. Thus the damping valve 55 is opened during a compression stroke of the hydraulic damping device when the piston 24 descends and oil from the oil chamber 24 flows into the oil chamber 42 of the reservoir 50. The check valve 59 is opened during an expansion stroke of the hydraulic damping device when the piston 24 ascends and oil from the oil chamber 42 flows into the oil chamber 29. A throttle resistance of the damping valve 55 is set higher than a throttle resistance of the damping valve 32 provided on the piston 24.

Reference numeral 57 in FIG. 1 shows a drain port provided on the sealing case 23 in order to allow discharge or inflow of oil. Although the drain port 57 connects the outside with the annular groove 28a of the oil chamber 28, normally the drain port 57 is closed by a drain plug 58.

The operation of the above arrangement will be described hereafter.

When the hydraulic damping device undergoes an expansion stroke, the piston 24 displaces in a direction in which the piston rod 25 expands. At this time, a part of the oil compressed in the upper oil chamber 28 applies pressure from the port 30a of the piston 24 onto the damping valve 31 and places the valve 31 in an open position. The oil then flows out into the expanded oil chamber 29. The remainder of the oil passes through the oil passages 33, 34 and flows into the oil chamber 42 of the reservoir 50 via the poppet valve 37 and the needle valve 35. The amount of oil flowing into the expanded oil chamber 29 from the oil chamber 42 of the reservoir 50 via the base valve 53 corresponds to the amount displaced by the piston rod 25.

However when the displacement speed of the piston 24 is slow, that is to say, in low piston speed regions, the resulting pressure in the oil chamber 28 is not high. Consequently the damping valve 31 does not open and the poppet valve 37 remains closed by the spring 40. Thus oil in the oil chamber 28 mainly flows only via the needle valve 35.

As a result, the generated damping force corresponds to the surface area of the opening of the port 33a of the needle valve 35. The damping force at this time can be regulated in a simple manner by changing the rotational position of the needle valve 35 using a screwdriver from an external position in order to regulate the surface area of the opening of the needle valve 35. For example, the damping force can be reduced by increasing the surface area of the opening of the port 30a by displacing the needle section 35a of the needle valve 35 upwardly.

In contrast, when the displacement of the piston 24 is rapid, that is to say, in medium to high piston speed regions, the pressure in the oil chamber 28 is high and the damping valve 31 is opened. The poppet valve 37 opens against the force of the spring 40 and oil flows in both the oil passage 34, 33 and the port 30a.

As a result, the generated damping force mainly represents the combination of the damping characteristics of the poppet valve 37 and the damping valve 31.

When the axial position of the adjuster 39 of the poppet valve 37 is rotated externally using a screwdriver for example, it is possible to regulate the initial load on the poppet valve 37 since the compressive amount on the spring 40 is varied. For example, when the axial position of the adjuster 39 is shifted upwardly, the compressive load on the spring 40 is weakened. Consequently the initial load on the poppet valve 37 is reduced and the resulting damping force is reduced.

In this manner, the combined damping force of the damping valve 31 and the poppet valve 37 is varied and as a result, it is possible to freely regulate the damping force in medium and high piston speed regions by varying the initial load on the poppet valve 37.

The head of the adjuster 39 and the head of the needle valve 35 both are exposed outwardly from the upper end of the sealing case 23. As a result, regulating operations on the damping force are facilitated by adjusting these components externally. Moreover there is no possibility that these components will interfere with the side near vehicle body on which the tip of the piston rod 25 is mounted.

During a compressive operation on the hydraulic damping device when load is applied to the piston rod 25, the piston 24 descends and oil in the compressed oil chamber 29 flows into the expanded oil chamber 28 through the damping valve 32 from the port 30b of the piston 24. The amount of oil flowing into the oil chamber 42 of the reservoir 50 from the port 54a of the base valve 53 through the damping valve 55 corresponds to the volume of the compression stroke of the piston rod 25.

Consequently the damping force during the compression stroke is generated as a discharge resistance in the oil from the compressed oil chamber 29 and overall which is equal to a combined damping force from the damping valve 55 of the base valve 53 and the damping valve 32.

However when the throttle resistance in the damping valve 55 of the base valve 53 is increased, a part of the oil in the oil chamber 28 also flows into the oil chamber 42 of the reservoir 50 through the poppet valve 37 and the needle valve 35 from the oil chamber 28 and generates a damping force.

In this case, the damping force on the compressed side is regulates in the same manner as the damping force on the expansion side. That is to say, it can be regulated by the needle valve 35 in low piston speed regions and by the poppet valve 37 in high piston speed regions.

Although the invention has been described above by reference to certain embodiments of the invention, the invention is not limited to the embodiments described above. Modifications and variations of the embodiments described above will occur to those skilled in the art, in the light of the above teachings.

What is claimed is:

1. A hydraulic damping device comprising:
   a cylinder disposed coaxially in an outer shell;
   a sealing case closing the open ends of the outer shell and the cylinder;
   a piston disposed to slide freely in the cylinder;
   a piston rod connected to the piston through the sealing case;
   two oil chambers partitioned by the piston in the cylinder;
   a reservoir provided between the cylinder and the outer shell;
   a damping valve provided in the piston and opening and closing a passage between the two oil chambers;
   a base valve interposed in a passage connecting the reservoir and the oil chamber in which the piston rod is not included;
   two parallel passages connecting the oil chamber in which the piston rod is included and the reservoir, the passages provided in the sealing case;
   a needle valve disposed in the sealing case and regulating the area of the opening of the one oil passage; and
   a poppet valve disposed in the sealing case and biased in a direction in which the other oil passage is closed by the spring and an adjuster regulating the biasing force of the spring of the poppet valve.

2. The hydraulic damping device as defined in claim 1, wherein the one passage comprises a port extending axially in the sealing case, one end of the port being connected with an annular groove opening provided on an inner peripheral face of the cylinder in the oil chamber in which the piston rod is included, the other end of the port being connected with the reservoir, the needle valve regulating the area of the opening of the port by displacing coaxially with respect to the port.

3. The hydraulic damping device as defined in claim 1, wherein the other passage comprises a port extending axially in the sealing case, one end of the port being connected with an annular groove opening provided on an inner peripheral face of the cylinder in the oil chamber in which the piston rod is included, the poppet valve closing this port being disposed coaxially with respect to the port, and an adjuster is provided on the rear of the poppet valve and regulates the biasing force of the spring by displacing axially towards the port.

4. The hydraulic damping device as defined in claim 2, wherein the needle valve is threadably engaged from an axial direction with the sealing case and a groove is formed on the head of the needle valve which is exposed outwardly from the end of the sealing case.

5. The hydraulic damping device as defined in claim 3, wherein the adjuster is threadably engaged from an axial direction with the sealing case and a groove is formed on the head of the adjuster which is exposed outwardly from the end of the sealing case.

6. A hydraulic damping device, comprising:
   a cylinder disposed coaxially in an outer shell;
   a sealing case closing the open ends of the outer shell and the cylinder;
   a piston disposed to slide freely in the cylinder, the piston partitioning the cylinder into two oil chambers;
   a piston rod connected to the piston in the cylinder;
   a reservoir provided between the cylinder and the outer shell;
   a damping valve provided in the piston and opening and closing the partition between the two oil chambers;
   a base valve connecting the reservoir and the oil chamber in which the piston rod is not included;
   two passages, each connecting the oil chamber in which the piston rod is included and the reservoir, the passage being provided in the sealing case; and
   an adjuster disposed in the sealing case, the adjuster varying the area of the passage connecting the oil chamber including the piston rod and the reservoir, the adjuster comprising two adjusters disposed in the sealing case, one adjuster varying the area of one of the passages connecting the oil chamber in which the piston rod is included and the reservoir and the other of the adjusters varying the area of the other of the passages connecting the oil chamber in which the piston rod is included and the reservoir, wherein one of the two adjusters is a needle valve and the other of the two adjusters is a poppet valve.

7. The hydraulic damping device of claim 6, wherein the adjuster is threadably engaged from an axial direction with the sealing case and a groove is formed on the head of the needle valve which is exposed from the end of the sealing case.

8. The hydraulic damping device of claim 6, wherein the two passages connecting the oil chamber in which the piston rod is included and the reservoir are parallel to each other.

9. The hydraulic damping device of claim 6, wherein the needle valve is threadably engaged from an axial direction with the sealing case and a groove is formed on the head of the needle valve which is exposed from the end of the sealing case; and wherein the poppet valve is threadably engaged from an axial direction with the sealing case and a groove is formed on the head of the poppet valve which is exposed from the end of the sealing case.

* * * * *